UNITED STATES PATENT OFFICE.

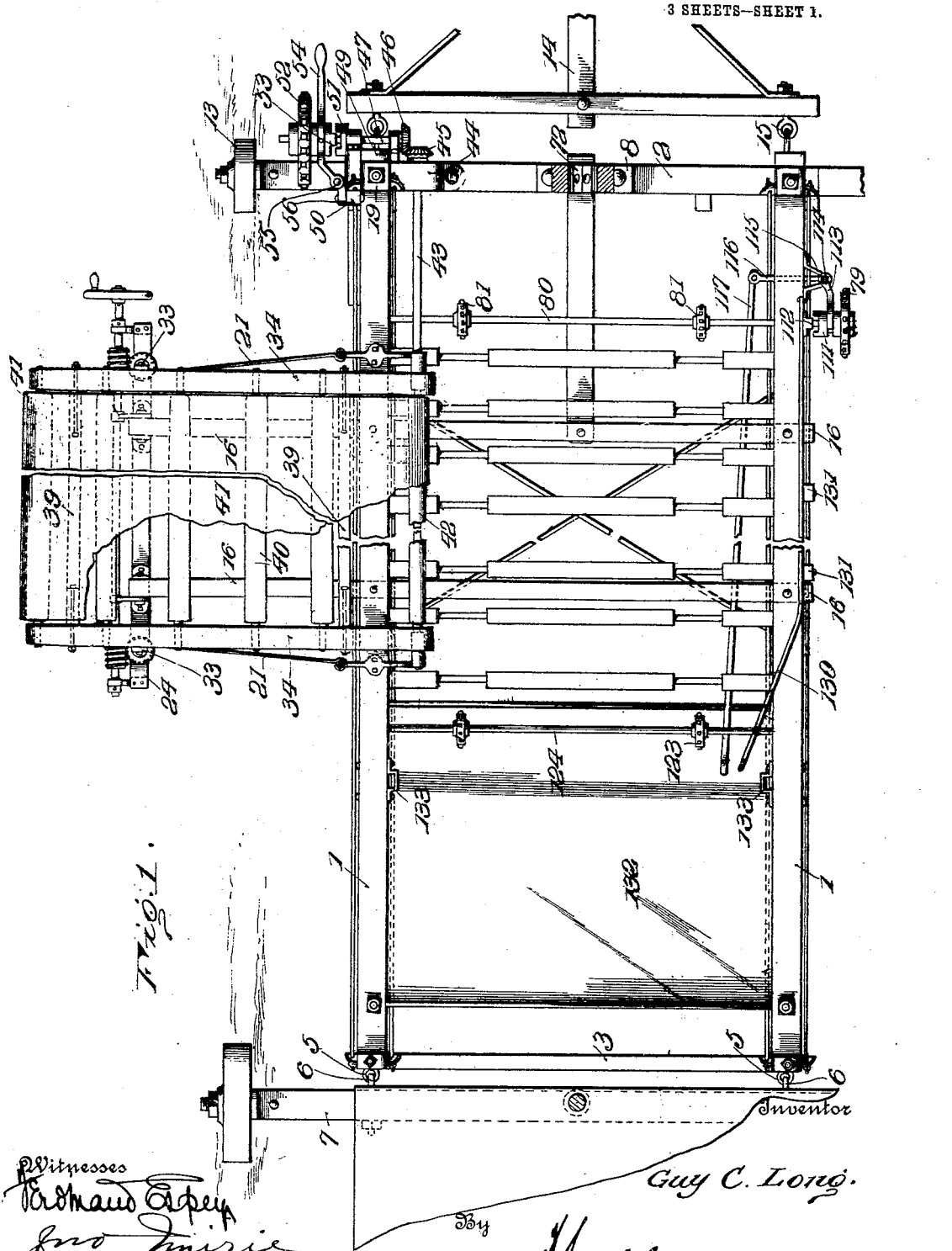

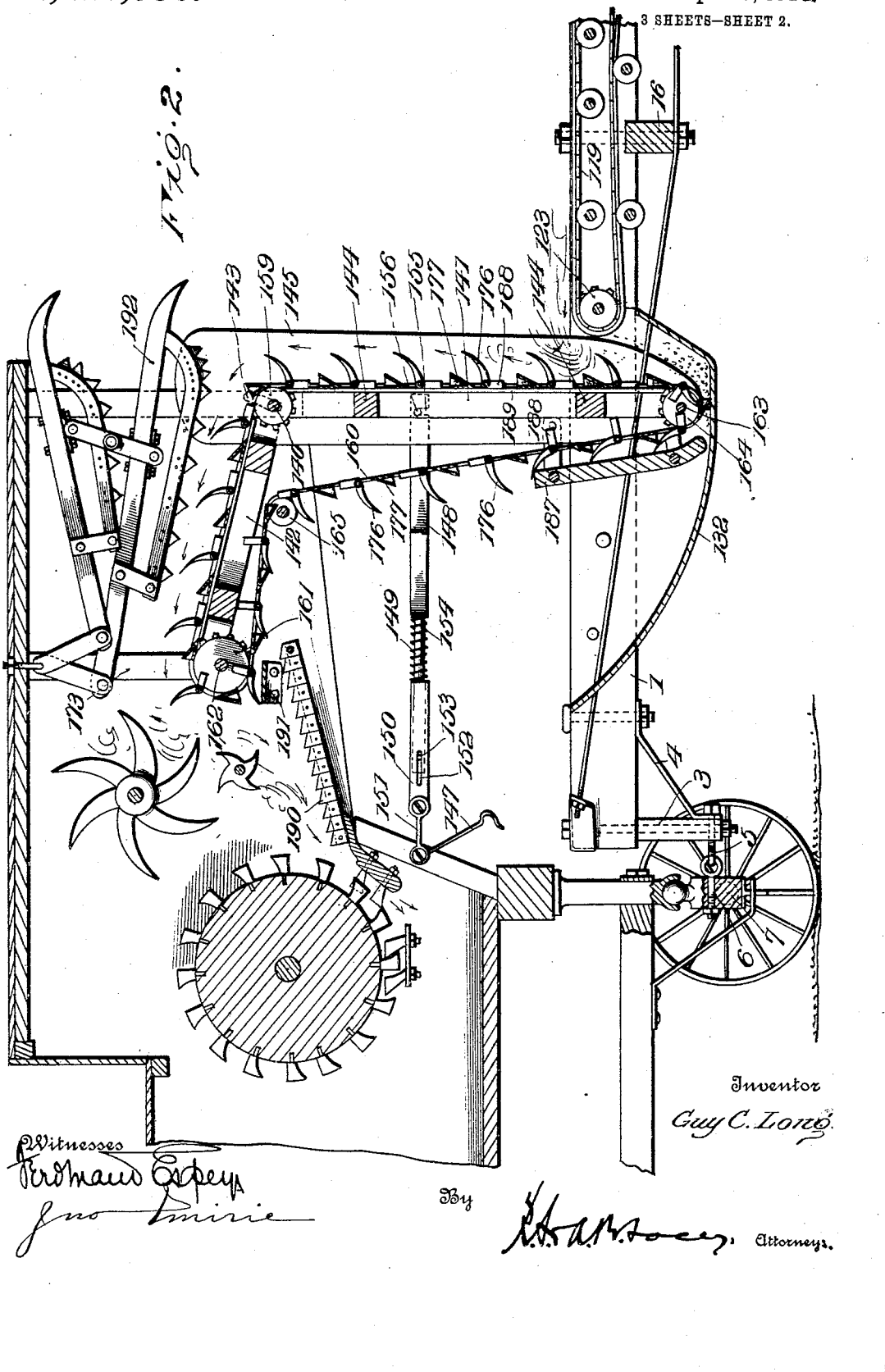

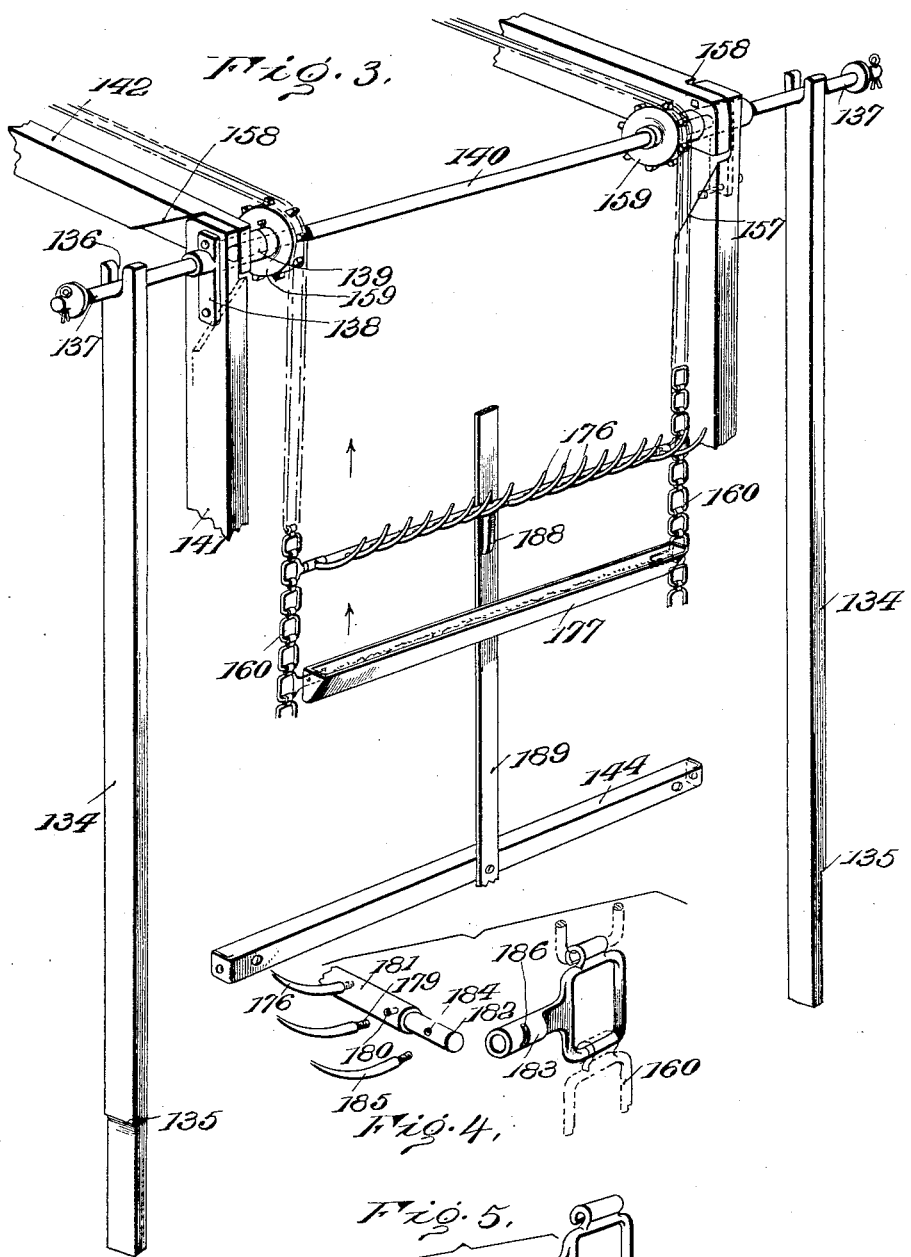

GUY C. LONG, OF TIMBER LAKE, SOUTH DAKOTA.

AUTOMATIC FEEDER FOR THRESHING-MACHINES, &c.

1,110,950.   Specification of Letters Patent.   Patented Sept. 15, 1914.

Application filed July 25, 1913. Serial No. 781,235.

*To all whom it may concern:*

Be it known that I, GUY C. LONG, a citizen of the United States, residing at Timber Lake, in the county of Dewey and State of South Dakota, have invented certain new and useful Improvements in Automatic Feeders for Threshing-Machines, &c., of which the following is a specification.

This invention has for its object the provision of novel means whereby loose grain or grain in bundles may be automatically conveyed from a wagon or truck to a threshing machine or other similar mechanism and delivered without any attention upon the part of the operator other than depositing the bundles or grain upon the receiving apron or table.

A further object of the invention is to provide novel means for lifting the grain from the conveyers to the operating instrumentalities of the threshing machine and to provide means whereby the conveyers will be automatically rendered inoperative should the grain be fed too rapidly to the lifting mechanism.

Other objects of the invention are to provide improved means whereby the lifting devices will properly engage the grain, while, at the same time, they will be automatically shifted so as to avoid injurious contact with the conveyer or the parts immediately adjacent the same, and, finally, the invention has for its object to improve, generally, the construction and arrangement of the several parts of a feeding mechanism to the end that the durability and efficiency of the same may be increased.

All these stated objects, and such other incidental objects as will hereinafter appear, are attained in such mechanism as is illustrated in the accompanying drawings and hereinafter fully described.

The invention resides in certain novel features which will be particularly pointed out in the claims appended to the description.

In the drawings: Figure 1 is a plan view of the lower portion of the feeder with the conveying aprons and parts of the operating mechanism removed; Fig. 2 is an enlarged vertical longitudinal section through the lifting mechanism; Fig. 3 is a detail perspective view of a portion of the lifting mechanism; Fig. 4 is a detail perspective view of parts of the elevating chain showing the same separate but in their proper relative positions; Fig. 5 is a similar view of another portion of the elevating chain.

In carrying out my present invention, I employ a truck which is intended to be connected to the front axle of the threshing machine and be supported at its rear end by the said axle and be supported at its front end upon its own axle. This truck comprises the longitudinal side sills 1 having their front and rear ends resting upon and rigidly secured to bolsters 2 and 3, respectively, the rear bolster being connected with the said side sills by braces 4. In the rear sill 3, I secure eye-bolts 5 which are engaged in eye-bolts 6 secured in the front axle 7 of the threshing machine so that, while the rear end of the truck will be supported by the front axle of the threshing machine, the parts will be flexibly connected so that the apparatus may travel readily over an uneven surface without exerting a breaking strain upon any of the operating mechanism. The front bolster 2 of the truck has a casting 8 secured thereto at its center and forming one member of a ball and socket connection with the front axle 10 of the truck so that the said axle may readily follow irregularities in the surface of the ground without affecting the stability of the operating mechanism. Ground wheels 13 are mounted upon the ends of the front axle and a tongue or draw bar 14 is connected with the axle by eye-bolts 15 in the same manner that the rear sill 3 of the truck is connected with the front axle of the threshing machine.

Cross bars 16 are secured to the undersides of the longitudinal sills and extend laterally beyond one side of the truck. The laterally extending portions of the cross bars 16 form part of the support for the receiving table or conveyer and to prevent the free ends of the said cross bars giving way under the weight of the receiving conveyer and the weight of the grain deposited thereon I provide the braces 21 which have their inner ends supported at the side sills 1 and their outer ends engaged in eyes or hooks on the upper sides of the said cross bars at the outer extremities of the same. A shelf or rail 24 is disposed below and supported from the cross bars or supporting arms 16, and upon this shelf are mounted lifting screws or jacks 33, the upper ends of which are attached to the side bars 34 of the receiving conveyer. It will be readily understood that by proper manipulation the jacks or screws 33 will be caused to travel upwardly or downwardly and adjust the receiving conveyer to the height of the wagon from which the grain is being unloaded.

The side bars 34 are formed or otherwise provided with bearings to receive the reduced ends of rollers 40 which support the endless apron 41 constituting the receiving platform or table, and motion is imparted to the said apron by a roller 42 which is disposed within the inner bight of the apron and is rigid with a shaft 43 which extends longitudinally of the truck and is journaled in and supported by the bracket which support the inner ends of the side bars 34. The front end of the said shaft 43 extends to and through a standard 44 which is erected upon the bolster 2, as shown, and a bevel pinion 45 is fixed upon the front extremity of the said shaft and meshes with a similar pinion 46 which is secured upon the inner end of a shaft 47 journaled in bearings 48 secured to and projecting from a plate or bracket 49 which is secured to the said standard 44 and to an upright 50 which is secured rigidly to the side sill 1 immediately adjacent the bolster 2 and rises therefrom.

A clutch member 51 is secured rigidly upon the shaft 47 adjacent the outer side of the outer bearing 48 and beyond the said clutch member a sprocket wheel 52 is mounted upon the said shaft and slidable thereon, the said sprocket wheel being constructed with a clutch hub 53 adapted to engage the clutch member 51 so that the motion of the sprocket wheel will be transmitted to the said shaft and thence through the described gearing to the receiving platform or conveyer. The sprocket wheel with its clutch hub is controlled by a hand lever 54 engaging an annular groove in the clutch hub and pivoted at its inner end 55 to a bracket or other support 56 which is secured upon the outer side of the upright 50. A sprocket chain is trained around the sprocket wheel 52 and a sprocket pinion supported upon the uprights 50 and actuated by the driving mechanism.

A sprocket wheel 79 is carried by a transverse shaft 80 which is journaled in and extends between the side sills 1. The sprocket 79 is driven directly by the actuating mechanism and the shaft 80 is equipped with sprocket wheels 81 which are adapted to engage and actuate the main conveyer, as will be presently set forth.

The sprocket wheel 79 is slidably mounted upon the shaft 80 and is provided with a clutch hub 111 adapted to engage a clutch member 112 rigidly secured upon said shaft. The clutch hub 111 is engaged by a fork 113 secured to the upper end of a rock shaft 114 journaled in a suitable bracket 115 secured to the outer side of the sill 1 and having an arm 116 extending inwardly from its lower end. To the inner end of this arm 116 is pivoted the front end of a connecting rod 117 which extends longitudinally of the truck and has its rear end connected to the elevator presently to be described. It will be readily understood that if the said connecting rod 117 be drawn rearwardly, the arm 116 will be vibrated so that the shaft 114 will be rocked and the fork 113 moved outwardly so that the hub 111 will be disengaged from the clutch member 112 and the sprocket wheel 79 then permitted to run idly upon the shaft 80. As before stated, the shaft 80 is provided with sprocket pinions 80 81 and these sprocket pinions engage chains which carry the main conveyer.

The main conveyer consists of a series of slats 119 extending transversely between the side sills 1, as will be readily understood. The slats are secured upon endless sprocket chains in such a manner that they will clear the teeth of the sprocket wheels 81 and of similar sprocket wheels 123 which are engaged by the rear bights of the sprocket chains.

As disclosed more particularly by Fig. 1, the main conveyer extends under the inner end of the receiving conveyer so that the grain deposited upon the receiving conveyer will be discharged therefrom directly onto the main conveyer and will be carried rearwardly to the elevator by the said main conveyer. To prevent the grain rolling from the edge of the main conveyer, I secure to the side sill 1 a shield 129 consisting of a board or plate extending longitudinally of the sill and having its rear end turned inwardly over the sill, as shown at 130, so as to guide the grain positively to the elevator and the boot or hopper in which the lower end of the elevator plays. The shield is supported upon the sill by standards 131 secured to the shield and the sill.

The rear end of the conveyer is arranged approximately over the front end of a boot or hopper 132 which consists of a curved bottom plate and substantially vertical side plates rigid with the edges of the bottom plate and secured to the inner sides of the side sills 1. Any grain which might escape the elevator or lifting mechanism as it passes from the main conveyer will be caught in this boot or hopper and will, consequently, be saved instead of falling to the ground and being lost. The lifting mechanism consists of an endless conveyer which is arranged to travel upwardly past the rear end of the main conveyer and into the threshing machine so as to deliver the grain to the operating members of the threshing machine. To support the elevator in proper position relative to the main conveyer, I provide upon the inner sides of the side sills 1, adjacent the rear end of the main conveyer, the loops or brackets 133 in which are fitted the lower ends of props 134 which have their lower ends shouldered, as illustrated at 135 to fit over the upper edges of the sills. The upper ends of these props are notched, as shown at 136, to engage trunnions or supporting pins 137 projecting from brackets 138 having sleeves 139 formed on their inner sides to constitute bearings for a shaft 140. The brackets 138 are secured to the outer sides of side bars 141 and the sleeves or bearings 139 extend through the upper ends of said bars and the front ends of co-acting bars 142, the said bars 141 and 142 constituting the principal frame members of the elevator. As the truck will not always be at the same distance below the extreme front portion of the threshing machine frame, owing to irregularities in the surface of the ground, I form slots 143 in the frame of the threshing machine so that variations in the relative heights of the truck and the threshing machine may be accommodated by permitting the shaft 140 and the trunnions or supporting pins 137 which extend through said slots to assume higher or lower positions relative to the main frame. The bars 141 are connected at intervals by braces 144, and to the outer sides of said side bars I secure the sideboards 145 which project in advance of the elevator so that the grain taken up by the elevator will not be permitted to slip from the sides thereof. The rear end of the connecting rod 117 is engaged in an eye 146 upon the side of the elevator when the elevator is in its operative position, so that, should the pressure of the grain fed to the elevator by the main conveyor rise above a predetermined standard, the elevator will yield and move rearwardly and, consequently, pull upon the said connecting rod 117 so as to move sprocket wheel 79 to the position where it will run idle, as hereinbefore described.

It will be clear, upon reference to Fig. 3 of the drawings, that the side bars 141 may swing rearwardly and upwardly about the pivotal support thereof in the upper ends of the props 134 and when the elevator is not in use it is so swung upwardly and rearwardly, and is held in such raised position by a hook or similar device 147 secured upon the threshing machine frame and adapted to engage the eye 146 on the side of the elevator. The elevator is yieldably held in its operative position by a fork 148 having its stem 149 playing in a socket 150 which is pivotally attached to the threshing machine frame through a link 151 and is provided in its sides with longitudinal slots 152 adapted to be engaged by the ends of a pin 153 inserted through the rear end of the stem 149. Rotation of the stem and its fork within the socket is thereby prevented, while the sliding of the stem within the socket is permitted. A spring 154 is coiled around the stem between the cross bar or shoulder of the fork 148 and the end of the socket 150, and this spring by its expansion tends to hold the fork and the elevator in their forward operative positions. The outer free ends of the fork are provided with notches 155 adapted to engage pins 156 on the sides of the elevator frame so as to hold the elevator in its lowered position, while, at the same time, the fork may be easily released when such action is necessary. The meeting ends of the elevator frame bars 141 and 142 are reduced and provided with shoulders 157 and 158, respectively, so that the bars may be readily folded relative to each other to permit the elevator to be swung into the inoperative position.

Upon the shaft 140 are secured sprocket pinions 159 over which run the endless chains 160 constituting the carrying members of the elevator, and other sprocket wheels 161 are secured upon a shaft 162 which is journaled in bearings at the inner rear ends of the frame bars 142. At the lower ends of the frame bars 141 is carried a third shaft 163 upon which are secured sprocket wheels 164, and idlers 165 are mounted upon the lower forward portion of the threshing machine frame, as shown. Motion is imparted to the chains 160 from the sprocket wheels 161 which are rotated by the shaft 162 which is equipped at one end with a pinion 166 meshing with a pinion 167 carried by a stub-shaft mounted in the side of the threshing machine frame and having formed therewith a sprocket pinion 168 over which a chain 169 is trained. The said chain is also trained over a sprocket 170 secured upon the shaft of the upper feed bars of the threshing machine and a band pulley 171 is also secured upon the said shaft and connected by a suitable belt with some moving part of the threshing machine so as to rotate the said shaft in the usual manner. The shaft 162 rotates in a bearing consisting of a sleeve 172 which extends through the end of the elevator frame bar 142 and through the side of the threshing machine frame, indicated at 173. At its outer end the said sleeve is formed with an annular flange 174 through which securing bolts 175 are inserted to fasten the bearing rigidly to the threshing machine frame.

The grain is carried from the boot or hopper 132 to the threshing machine mechanism by fingers 176 arranged in series transversely between the chains 160, and, as a considerable quantity of the grain is threshed out from the straw in the handling of the grain and while it is being conveyed to the elevator, I provide buckets or scoops 177 which extend between the chains 160 and alternate with the lifting fingers 176, as clearly shown and as will be understood. These buckets or scoops are trough-like structures having closed ends and bottoms and open tops so that as they ride over the bottom of the hood 132 they will take up the loose grain, as will be readily understood on reference to Fig. 2. Some of the links of the chains 160 are provided with inwardly projecting tangs or arms 178 and suitable bolts or rivets are inserted through these arms or tangs and the backs of the scoops or buckets to secure the buckets to the chains. The fingers 176 have threaded shanks 179 which are engaged in threaded openings 180 in rods 181, the said rods having reduced cylindrical ends 182 to fit in sleeves or bearings 183 projecting laterally inward from some links of the chains 160. The reduced portions 182 of these rods 181 are also provided with threaded openings 184 and lifting fingers 185, corresponding in all respects to the fingers 176, are engaged in the said openings 184, the shanks of these fingers 185 being inserted through slots 186 formed in the circumferences of the sleeves 183 so that a rotary movement or rocking movement of the rods 181 will be permitted and the extent of said movement will be limited by the fingers 185 engaging the ends of the slots 186 and, at the same time, movement of the rods longitudinally will be prevented.

Tripping guides 187 are carried by the lower portions of the side-boards 145 of the elevator and these tripping guides are so arranged that as the fingers move downwardly toward the bottom of the hood 132 the fingers 185 will impinge against the said tripping guides and will be swung backwardly toward the chains, and, inasmuch as the said fingers can have no movement independently of the rods 181, the rods will be successively rocked so that the entire gang of fingers will be swung backwardly toward the chains. The fingers will thus be moved into such a position that they will not strike against the bottom of the hood 132 and be broken off or possibly damage the hood. As the elevator chains enter upon their upward run, the fingers will be returned to their operative position, so as to take into the grain, by the triggers 188 engaging the rails 189 which are disposed in rear of the elevator chains and are supported by the cross bars 144 of the elevator frame. The triggers 188 are disposed at the centers of the rods 181 and are rigid with the said rods and extend from the same at an angle to the fingers. As the chains move past the lower end of the rail 189, the fingers 188 will be successively brought against the said lower end of the rail, as shown in Fig. 2, and the upward movement of the said triggers will be, consequently, momentarily arrested so that the rods 181 will be then rocked to bring the fingers into such position that they will project forwardly from the elevator and will take up portions of the grain as they move upwardly. The triggers will remain in contact with the rail until the grain has been delivered to the threshing mechanism, so that the fingers will be prevented from swinging downwardly under the weight of the grain, and loss of the grain will be thereby prevented. To prevent the fingers striking the feeding pan 190 point first and thereby damaging some of the parts, I provide a trip plate 191 which extends between the frame members 173 below the shaft 162 and the sprocket wheels 161 thereon so that as the fingers move around the upper inner bight of the elevator they will be brought against the said trip plate and swung rearwardly so as to clear the feeding pan. Moreover, this action serves to free the fingers of any straw or grain which may tend to cling thereto so that none of the grain will be dragged back with the return run of the elevator.

It will be readily noted that the sprocket wheels 159 and 161 are so located that the upper portion of the elevator runs substantially parallel with and close to the usual feeding bars 192 of the threshing machine so that the grain taken up by the elevator will be positively fed to and delivered in the threshing machine.

It is thought the operation of my improved apparatus will be readily understood from the foregoing description, taken in connection with the accompanying drawings. The wagons containing the grain to be threshed are driven to a point where they may be unloaded directly onto the receiving conveyer and the grain, whether it is loose or in bundles, is deposited upon the said receiving conveyer and will then be carried into the threshing machine without any further attention upon the part of the operator. The receiving conveyer carries the grain inwardly over and discharges it onto the main conveyer which in turn carries it to the elevator. As the grain can be carried up by the elevator only in quantities determined by the capacity of the fingers, if the conveyers carry the grain to the elevator in quantities in excess of such capacity, the grain will tend to accumulate between the rear end of the main conveyer and the lower portion of the elevator, thereby increasing the pressure upon the elevator. The ability of the elevator to withstand this pressure is determined by the tension of the spring 154 which yieldably holds the elevator toward the conveyer. Should the pressure upon the elevator exceed the tension of the spring, the elevator will swing rearwardly and thereby exert a pull upon the connecting rod 117 which, as before stated, will actuate the arm 130

116 so as to rock the shaft 114 and thereby move the sprocket 79 away from the clutch member 112 so that the sprocket will then run idle and the shaft 80 will remain at rest so that the main conveyer will not move and no grain will be fed to the elevator until the previously fed excess of grain has been taken up by the elevator, whereupon the spring 154 will return the elevator to its operative position and a reverse movement will be transmitted to the connecting rod 117 and the shaft 144 so that the sprocket 79 will again actuate the shaft 80 and the conveyer will resume the carrying of grain to the elevator.

The elevator is driven from a moving part of the threshing machine, as before stated, while the conveyers are driven through power derived directly from the main power belt running between the threshing machine and the engine.

My improved feeding mechanism may be applied to various forms of separators and changes in the minor features of construction may be made at will to accommodate the mechanism to various types of machines without involving any departure from the scope of the invention as the same is defined in the following claims.

What I claim is:—

1. The combination of a boot, series of lifting fingers arranged to travel over the bottom of the boot and upwardly therefrom, connections between the series of fingers, means for swinging said fingers to inoperative position as they approach the bottom of the boot, and means for swinging the fingers to operative position as they rise from the bottom of the boot.

2. The combination of a boot, an elevator frame hung above and extending into the boot, a tripping guide secured to the rear guide of the elevator frame and extending to near the bottom of the boot, a guide rail secured to the front side of the elevator frame, endless chains mounted on the elevator frame, rocking rods carried by said chains, fingers projecting from said rods and adapted to engage the tripping guide, and triggers projecting from the rod at an angle to the fingers and adapted to ride on the guide rail.

3. The combination of a boot, endless chains moving in proximity to the bottom of the boot and upwardly therefrom, buckets carried by said chains to move over the bottom of the boot, series of fingers carried by the chains and arranged alternately with the buckets, means for rendering said fingers inoperative as they move toward the bottom of the boot, and means for projecting the fingers to operative position as they move upwardly from the boot.

4. The combination of an elevator frame, a tripping guide thereon, endless chains mounted on the frame, inwardly projecting sleeves on one of the chains provided with annular slots, rods journaled in said sleeves, and fingers projecting from said rods, the fingers at the ends of the rods playing in the said slots and arranged to engage the tripping guide.

In testimony whereof I affix my signature in presence of two witnesses.

GUY C. LONG. [L. S.]

Witnesses:
V. CEEDENSON,
A. H. SCHWARTZ.

---

Copies of this patent may be obtained for five cents each, by addressing the "Commissioner of Patents, Washington, D. C."